United States Patent [19]

Sundén

[11] 4,294,885
[45] Oct. 13, 1981

[54] SURFACE-MODIFIED PIGMENT OF NATURAL KAOLIN MATERIAL AND A PROCESS OF PRODUCING SAME

[75] Inventor: Olof Sundén, Lidingö, Sweden

[73] Assignee: EKA AB, Surte, Sweden

[21] Appl. No.: 149,769

[22] Filed: May 14, 1980

[30] Foreign Application Priority Data

Jun. 1, 1979 [SE] Sweden ............... 7904814

[51] Int. Cl.$^3$ ............... B32B 5/16; B32B 9/00
[52] U.S. Cl. ............... 428/404; 427/214; 428/407
[58] Field of Search ............... 428/403, 404, 407; 427/214, 215, 218, 219

[56] References Cited

U.S. PATENT DOCUMENTS

| | | | |
|---|---|---|---|
| 3,236,802 | 2/1966 | Ferrigno | 428/404 |
| 3,590,018 | 6/1971 | Gebura | |
| 3,873,336 | 3/1975 | Lambert et al. | 106/306 |
| 4,072,537 | 2/1978 | Kurrle | 428/404 |
| 4,107,376 | 8/1978 | Ishikawa | 428/404 |
| 4,186,224 | 1/1980 | Grillo | 428/404 |
| 4,216,135 | 8/1980 | Finlayson | 428/404 |
| 4,218,502 | 8/1980 | Graham et al. | 428/404 |
| 4,242,251 | 12/1980 | Aishima et al. | 428/404 |

FOREIGN PATENT DOCUMENTS

| | | |
|---|---|---|
| 465583 | 8/1973 | Australia . |
| 901715 | 5/1972 | Canada . |
| 2746968 | 5/1978 | Fed. Rep. of Germany . |
| 137319 | 6/1974 | United Kingdom . |
| 1425114 | 2/1976 | United Kingdom . |

Primary Examiner—William J. Van Balen
Attorney, Agent, or Firm—Luedeka & Fitch

[57] ABSTRACT

A surface modified pigment formed from kaolin material and a process of producing same are described.

The pigment consists of pigment particles of kaolin material, and on the surface of the particles a primary and a secondary layer are precipitated. The primary layer consists of an anionic $Al_2O_3$—$SiO_2$ hydrate gel having a molar ratio of $SiO_2:Al_2O_3$ of from 3 to 30 and is present in a quantity corresponding to from 2 to 15% by weight of $SiO_2$, based upon the original quantity of kaolin material. The secondary layer consists of a polymeric binder which is bonded to the primary layer by hydrogen or ion bonding and which is included in a quantity of at least 2% by weight, based upon the original quantity of kaolin material.

The pigment is prepared by dispersing the pigment particles in water and providing them, while they are dispersed, with precipitated primary and secondary layers. The primary layer of anionic $Al_2O_3$—$SiO_2$ hydrate gel is precipitated by acidifying water glass with an aluminium salt and acid, and the secondary layer is formed by adding a polymeric binder, the primary and secondary layers being bonded to one another by hydrogen or ion bonding. The pigment is retained in aqueous dispersion until after application.

The surface-modified pigment is intended for use in paper and coats of paint.

5 Claims, No Drawings

SURFACE-MODIFIED PIGMENT OF NATURAL KAOLIN MATERIAL AND A PROCESS OF PRODUCING SAME

This invention relates to a modification of the surface of kaolin pigment, whereby a highly hydrated anionic pigment material is obtained, to which special binders are bonded. On drying and dehydration, this surface-modified kaolin pigment gives appreciably stronger bonds between the pigment particles and to other substrates, such as paper fibers, painted surfaces and coats of paint. In addition, the dried products obtained, such as paper and coats of paint, have an appreciably higher whiteness and opacity than natural kaolin is capable of producing.

The modification involves coating the particle surfaces of kaolin with at least two precipitates which can be precipitated separately or simultaneously and which, for the sake of simplicity, are called, respectively, the primary and the secondary precipitate hereinafter. The primary precipitate consists of aluminium-silica-hydrate gel precipitated from an aqueous suspension at acidic pH values of from 1.5 to 5.0. A water-insoluble gel of anionic character is deposited on the surfaces. The formula of this gel can be expressed as $Al_2O_3 \cdot nSiO_2 \cdot mH_2O$, where n may very from 3 to 30 and m is a high number of 100 or higher. A further binder or binder combination is applied to this primary inorganic precipitate, i.e. a secondary precipitate, utilising the strong hydrogen bonds or ion bonds of the primary aluminium-silica-hydrate gel. The secondary precipitate which may be applied after or simultaneously with the primary precipitate, consists primarily of organic binders with ion-bonding or hydrogen-bonding capacity, such as cation-active starch or cationic urea formaldehyde resin having a sufficient degree of condensation, gelatin, etc.

The surface-modified pigment material according to the invention is primarily intended for use in the paper industry as a furnish additive, where it gives very high retention values, in addition to producing a paper of good strength and opacity. Moreover, the pigment can be used as white pigment in the paint industry.

The use of kaolin as furnish additive and filler in the manufacture of paper has long been known. The use of kaolin as an extender pigment in paints is also well known. Also the chemicals and binders used for this invention are already well known and are used in the paper industry and, to some extent, also in the paint industry. Even though kaolin has been used in the paper industry for many decades, insuperable difficulties are still encountered in using more than 20% kaolin in paper, due to a substantial reduction in the paper strength and poor retention in the forming of paper. It therefore is surprising that, by determined build-up of several layers of precipitates on the kaolin surfaces by basically well-known and inexpensive chemicals, it is possible to eliminate these problems which have caused increasing difficulties in the paper industry as the cost of pulp raw material has increased. It is also surprising that, in the paint industry, relatively expensive titanium dioxide is used to a large extent for the white pigment and that no consideration has been given in the past to achieving essentially the same degrees of whiteness by simple built-up of different layers on the kaolin pigment, in order thereby to achieve an appreciable reduction of the cost of paint.

Water glass which is one of the key chemicals for the application of this invention, has long been used in the paper industry, although it is generally the pulp which is treated to achieve increased hydration, bleaching and deinking. The procedure of treating kaolin directly with water-glass is extremely rare and, when applied, the aim invariably appears to be the achievement of a better dispersion and lower viscosity of the kaolin suspension; in other words, the water glass is used as a dispersing agent. According to published literature, no precipitation of a bound and durable $Al_2O_3$—$SiO_2$ hydrate gel layer on kaolin surfaces has been employed. In particular, a determined build-up of a primary layer of $Al_2O_3$—$SiO_2$ hydrate gel and a secondary layer of organic binder is a technical novelty.

Patent literature contains many proposals for improving the pigments for the paper industry and the paint industry. A characteristic feature of these proposals is that the pigment is coated with some active surface material and then is dried before the pigment is used in the paper stock or the paint. In the present invention, no such drying of the pigment takes place because such drying would destroy the finely dispersed form of the pigment. The pigment is used in a strongly hydrated form, and the active organic binder—in the form of urea resin, starch, polyacrylate latex etc.—is made insoluble and is bonded to the $Al_2O_3$—$SiO_2$ hydrate gel by hydrogen or ion bonds and thus not by drying. The technical method of producing surface-modified kaolin according to the present invention is basically as follows. The special features of the method are illustrated by the Examples given in the following.

The basic material is kaolin of standard quality (e.g. English quality C with a particle size of from 0.5 to 10 $\mu m$). Kaolin-like minerals other than those classified as kaolin may also be used, such as less alkaline talcum types, although the collective concept "kaolin" or "kaolin material" is here being used for such kaolin-like mineral pigments.

Kaolin is suspended in water in which water glass has been dissolved. The water glass should preferably be of the high-ratio type ($SiO_2$:$Na_2O$ should be at least 3 and not more than 5), in order to avoid unnecessarily loading the suspension with sodium salts from the subsequent acidification. A suitable concentration is from 40 to 50% of kaolin based on the weight of the entire suspension, and the quantity of water glass is preferably up to a value corresponding to 6% of soluble $SiO_2$, based on dry kaolin. Other $SiO_2$ quantities may, however, also be employed. After the suspension has been homogenised, a solution of alum (aluminium sulphate) and some sulphuric acid are added very quickly under intense agitation. The Al additive is determined by the molar number n required in accordance with the above-mentioned formula $Al_2O_3 \cdot nSiO_2$. As already mentioned, the value of n may vary between 3 and 30, with a suitable optimum between 8 and 15 which, in weight, corresponds to about from 20 to 10% $Al_2O_3$ based on $SiO_2$. It is extremely important that the pH of the original alkaline (water glass alkaline) kaolin suspension (pH about 10) is quickly lowered to a pH of from 1.5 to 5.0, preferably from 2.0 to 3.5 or from 2.5 to 3.5 because the more acidic the suspension, the lesser will be the formation of gel lumps in the suspension. Specifically in order to avoid the formation of gel lumps, it is advisable to use an excess of alum and sulphuric acid, particularly if high contents of $SiO_2$ on the kaolin layer are required, so that the pH of the mixture will be from 2.0 to 2.5, and also to add afterwards some further diluted water glass so that the precipitation pH will have an optimum value of from 2.5 to 3.5. At this pH, the precipitation of $Al_2O_3$—$SiO_2$ hydrate gel on the kaolin surfaces will take place relatively slowly. The reaction takes from about 0,5 to about 6 hours. After that time the quantity of soluble and colloidal silica in the water solution will have fallen to such low values that the modified kaolin slurry can be used as a paper raw material.

To ensure that the primary $Al_2O_3$—$SiO_2$ hydrate gel will give the kaolin a sufficiently anionic character and a sufficient bonding capacity, at least from 2 to 3% $SiO_2$ are required as hydrate gel, based on the kaolin. The $SiO_2$ content may be raised right up to from 12 to 15% in the hydrate gel, although an anionic capacity of this magnitude can seldom be fully utilized and contributes to increased costs, in spite of the fact that the chemicals themselves are inexpensive. Optimum anionic capacity is achieved at from 5 to 10% $SiO_2$.

Normal kaolin material is usually given the formula $Al_2O_3.2SiO_2.2H_2O$ which should be compared with the average formula at the hydrate gel forming the primary layer of the present invention, i.e. $Al_2O_3.12SiO_2.mH_2O$. According to the invention, a primary surface coating is achieved which also is of a kaolin-like material, but with a considerably increased silica content ($SiO_2$ content) and a far higher degree of hydration. This primary surface coating has three characteristic properties which distinguish it from the untreated kaolin surface, viz.

(1) high anionic capacity, whereby cation-active substances, such as cation-active starch, can be bonded under strong agglomeration;

(2) distinct hydrogen-bonding capacity, whereby polar, electron-donating organic substances, such as gelatin, polyether glycols and urea condensation products, can be bonded (see R. K. Iler, Journ. of Physical Chem., June 1952);

(3) a large volume due to the high degree of hydration ($m = 100$-$400$) which, on final drying of the hydrate gel, causes a cracked white coating on the kaolin, with a far higher hiding power than that of natural kaolin.

The secondary precipitate layer which, in the vast majority of cases, consists of an organic polymeric binder, can be added, if it is cation-active, in a suitable dilute form to a dilute kaolin suspension with a primary coating of $Al_2O_3$—$SiO_2$ hydrate gel. In the case of cation-active starch, a substantial, voluminous and agglomerated precipitate will then be obtained in dilute suspensions (from 2 to 10% dry solids content) which can be mixed directly with paper stock of cellulosic fibers, after adjusting the pH to a value of from 4.5 to 5.5 which is normally used in paper manufacture. However, it is important not to use more starch than can be bonded cationically to the anionic kaolin. If larger quantities are used, something similar to re-emulsification easily occurs. The starch and kaolin retention will be reduced, and the paper produced will have poorer strength properties, in spite of the higher starch consumption. For normally substituted cation-active starch, starch quantities corresponding to from 150 to 300% of the $SiO_2$ quantity in the hydrate gel can be used without exceeding this critical limit. In a similar manner, the cation-active urea formaldehyde resins can be used as cation-active binders. However, they do not give as heavily agglomerated precipitates as cation-active starch, and the usable quantity is more restricted and critical. In this case, the polymer molecules are smaller than in the case of cation-active starch, and the cation capacity per unit of weight thus is considerably higher.

In the same manner, a secondary layer of casein and gelatin can be precipitated in diluted systems. Although gelatin is amphoteric and thus is of a certain cationic character, the bond in the case of polypeptides is believed to be primarily a hydrogen bond to the silica component in the $Al_2O_3$—$SiO_2$ hydrate gel (R. K. Iler, Journ. of Physical Chemistry, June 1952). The precipitation of the secondary layer from heavily diluted systems appears to function satisfactorily in the case of polymeric binders of high solubility in water, in spite of the very high molar weight (above 10,000). On the other hand, if the binder is a urea formaldehyde resin, it will be water-soluble only at a relatively low degree of polymerisation, corresponding to molar weights far below 1,000. To form an insoluble secondary layer, urea formaldehyde resin must therefore be added in water-soluble, low-polymer form and must be subjected to further condensation after or concurrently with the precipitation of the primary layer of $Al_2O_3$—$SiO_2$ hydrate gel. For such condensation, an acid pH is required, and the pH range should preferably be the same as for the precipitation of the $Al_2O_3$—$SiO_2$ hydrate gel, i.e. from 2.5 to 3.5. If the concentration of the urea formaldehyde resin can be maintained at from 7.5 to 25.0%, based on the free water content, the polycondensation to insoluble resin will take from 3 to 6 hours at room temperature (from 15° to 30° C.). In this case, the polycondensation should not be pursued too far, since the resin will then lose its bonding capacity for papermaking purposes. For paper applications, the modified kaolin should be used within 15 hours, unless the formaldehyde content of the resin is very high (molar ratio formaldehyde:urea above 1.5) since the bonding capacity then decreases more slowly. For use as a paint pigment, the degree of polycondensation should be very high, and the reaction time should be at least 24 hours at room temperature since the secondary layer in this case acts as a binder only in combination with the actual paint binder (acrylate latex or the like).

Even without an organic polymeric secondary layer, kaolin with a freshly formed primary layer of $Al_2O_3$—$SiO_2$ hydrate gel about 6 hours old displays a very pronounced bonding capacity in paper manufacture. This effect can be attributed to the active polymeric silica in the hydrate gel. In old, inactive $Al_2O_3$—$SiO_2$ hydrate gel, the bonding effect can be re-established by adding a solution of oligomerous silica to the concentrated kaolin suspension. The new silica will then be absorbed into the gel at a pH of between 2 and 4 and will be retained after dilution and during paper manufacture. On the other hand, a stock of chemical pulp and natural kaolin shows no retention of oligomerous silica. Soluble oligomerous silica is produced, for instance, by rapid acidification of diluted water glass solution which is added to diluted sulphuric acid until its pH is from 2 to 3. Urea resin and oligomerous silica are both characterised in that they should be added in fairly concentrated form (from 5 to 25%) and that they undergo a polycondensation to insoluble, hydrogen-bondable form on contact with $Al_2O_3$—$SiO_2$ hydrate gel at a pH of from 2.5 to 3.5.

The binder quantities required obviously vary with the type of binder and the demands made on the final product. When the binder is cation-active starch and gelatin, at least 2%, based on the kaolin weight, are required for significant effects in paper bonding. Suitable quantities are from 4 to 12%, with an optimum between 5 to 10%, all based on the kaolin which at the same time should have a primary layer of from 5 to 10% $SiO_2$ in the form of $Al_2O_3$—$SiO_2$ hydrate gel. For urea formaldehyde resin which is not cation-active, the optimum quantity of $SiO_2$ is considerably higher, presumably because it is difficult to carry out the necessary polycondensation to hydrogen-bound insoluble resin when the quantity is below 20% resin, based on the kaolin quantity. On the other hand, urea formaldehyde resins can be used to advantage in very high contents corresponding to from 200 to 300% of the kaolin quantity. The technically useful limits for urea resin thus are very wide, i.e. from 10 to 400%, with an optimum at between 25 and 200%. As in the case of cation-active starch, cation-active urea resin should be used in smaller quantities, i.e. from 5 to 10%, and preferably in conjunction with high $SiO_2$ contents of from 6 to 15% in the primary gel, based on the kaolin quantity. Starch (non-cationic) and casein represent special cases as binders for the secondary layer. The $Al_2O_3$—$SiO_2$ silicate gel in the primary layer has a certain tendency to bond the non-cationic starch and the casein, although the retention values obtainable therewith are not very high. Cation-active starch and partially condensed urea resin on the other hand, can give retention values of from 80 to 100%, based on all of the components in the surface-modified kaolin.

Surface-modified kaolin according to the present invention can give very high retention values (from 80 to 100%) in paper manufacture, also in the papermaking machine. However, certain special conditions must be taken into account in view of the balance between the poly-anionic capacity of the surface-modified kaolin and the poly-cationic capacity of other components of the system. Alum is the least expensive poly-cation-active substance and in order to establish the necessary balance, it is advisable to add alum to the stock and to adjust its pH to about 5. Although the agglomerating Al links thus established between anionic particles (and fibers) are reinforced by bonding agents, such as cation-active starch and gelatin, they can be further and drastically reinforced by making proper use of the primary $Al_2O_3$—$SiO_2$ hydrate gel layer. Here, a further layer for retention can be said to exist which consists of polyacrylate latex, preferably non-ionically emulsified with ethoxy tensides. These acrylate emulsions are effectively bonded to the $Al_2O_3$—$SiO_2$ hydrate gel, int. al. by hydrogen bonding of the ethoxy link of the emulsifier to the silica. The most suitable acrylate polymer is a copolymer between ethyl acrylate and acrylamide which forms another layer having excellent wet adhesion. The formation of Al links is reinforced by the wet adhesion so that the agglomerates which are formed primarily by anion-cation attraction forces, will not be disrupted and colloidalised by the intense shear forces occuring during the forming of paper on the machine wire. A similar effect is achieved by polyacrylamide solutions without ethoxyemulsifier since amide groups, too, form hydrogen bonds with the silica polymer. Polyacrylamide in particular has long been used as a retention agent in the paper industry (under trade names such as PERCOL ®, Allied Colloids), but its effect on surface-modified kaolin is much stronger than on ordinary kaolin, provided that the anion-cation balance is such that the surface-modified kaolin particles will not be repelled from one another. As opposed to pure polyacrylamide, acrylate latex makes a considerable contribution to strength, although this will not occur if acrylate latex is used without $Al_2O_3$—$SiO_2$ hydrate gel. The bond between the $Al_2O_3$—$SiO_2$ hydrate gel and the acrylate latex thus is of importance to the strength properties of the paper, in spite of the very low contents employed.

Since these acrylate polymers are expensive, the contents must be kept low. A suitable content of polyethylacrylate is below 1%, preferably about 0.5% of the kaolin content. The preferred content of pure polyacrylamides is below 0.1%, preferably about 0.03%.

When surface-modified kaolin in accordance with the present invention is to be used for the production of paint, cation-active starch or gelatin obviously cannot be employed as a binder. A water-resistant and film-forming polymer must be provided as a binder for paint. Since a hydrated pigment is here concerned, it is best suited for water-based latex paints, primarily for those comprising acrylate or vinyl acetate latex and non-ionic ethoxy tensides as emulsifiers. According to the invention, the quantity of the latex binder is the same as in ordinary latex paint or from 20 to 70% of the pigment (dry polymer). If such a latex is mixed with surface-modified kaolin with a primary layer of $Al_2O_3$—$SiO_2$ hydrate gel, part of the organic polymer and ethoxy emulsifier will immediately be precipitated on the silica in the primary gel layer. When the paint subsequently dries, this polymer acquires an entirely new character. It will be stiffer, stronger and less sensitive to temperature by a "composite formation" with silica. It seems as if this stiffening of a relatively soft and film-forming polymer prevents the unmodified, soft polymer material from penetrating into the cavities of the kaolin and the dried hydrate gel so that the pigment after drying will have an intensely white appearance, with good opacity and hiding power. What happens is that a minor proportion of the latex material is precipitated on the primary layer of $Al_2O_3$—$SiO_2$ hydrate gel where it forms a secondary layer of a special character preventing the unmodified latex polymer from penetrating into the cavities and destroying the hiding power, while at the same time contributing to an increased bonding strength and reduced temperature sensitivity (plasticising). The whiteness and hiding power may be further improved by incorporating in the secondary layer an additional polymer which, in that case, should be of the amino resin type, preferably urea formaldehyde resin. To ensure satisfactory opacity and hiding power, the urea resin should be well hardened after application simultaneously with or after the primary layer. In addition, the molar ratio of formaldehyde to urea should be low, below 1.5, since high formaldehyde contents reduce the whiteness and opacity (but increase the bonding effect). After the primary layer has been stabilised and any urea resin has been condensed out at a pH of from 2.5 to 3.5, the pH can be raised to 6-8 which is the desirable pH for the paint.

Technically, it will be self-explanatory that the chemicals and products described for the application of this invention can be replaced within the scope of the appended claims, by others. Thus, sodium water glass may be replaced by potassium water glass, ethanol amine water glass, etc. Instead of alum, other soluble aluminium salts, such as aluminium acetate, may be used. Different types of kaolin can be employed, as can other kaolin-like materials, such as silicate pigments which are not highly alkaline, e.g. of the talcum type. In the production of paper, the chemical pulp component can be of any vegetable origin whatsoever, and can be produced in accordance with the sulphate process, the sulphite process or the semichemical process. Wood fibers in the form of groundwood pulp or thermomechanical pulp may also be used. For paper applications, the binder of the secondary layer may consist of some polymeric substance which is bonded to the anionic primary layer by hydrogen or ion bonds. In the present invention, the substances for the secondary layer are exemplified by gelatin, urea formaldehyde resin, cation-active starch and oligomerous silica. When the surface-modified pigment is to be used for paint applications, a special layer is produced in the form of a silica composite when pigment with a primary layer is mixed with polyacrylate latex. Numerous latex materials capable of replacing one another are available on the market, although butadiene styrene latex is not suitable for forming the secondary layer.

The product according to the present invention can be produced with considerable variations in the process steps. The kaolin can be coated with a primary layer of $Al_2O_3$—$SiO_2$ hydrate gel precipitated from a mixture of water glass solution and alum solution. The batching sequence can be varied, and the components can be added alternately in larger or smaller proportions. A salt, e.g. sodium sulphate, is formed as a by-product of this precipitation reaction. As a rule, this may accompany the product, but it may also be filtered off with the mother liquor, whereupon the kaolin with the primary layer and possibly also the secondary layer can again be dispersed in clean water. The secondary layer can be produced by precipitation on the $Al_2O_3$—$SiO_2$ hydrate gel in highly diluted systems, but if the bonding agent of the secondary layer at the same time is to undergo polycondensation, more concentrated systems must be employed. This is the case when urea resin and oligomerous silica are used as binders in the secondary layer. Oligomerous silica forms a hydrogen bond with the $Al_2O_3$—$SiO_2$ hydrate gel via water as an electron donor, although polyethylene oxide glycols with high molar weights (above 1,000 and preferably 4,000) are more effective electron donors. Such substances can thus modify the system without themselves acting directly as binders.

The pigment according to the present invention is characterised in that it consists of a kaolin material with a primary and a secondary surface layer, the primary surface layer consisting of $Al_2O_3$—$SiO_2$ hydrate gel which is included in a quantity corresponding to from 2 to 15% $SiO_2$, based on the kaolin quantity, and has the composition $Al_2O_3 \cdot nSiO_2 \cdot mH_2O$, where n is from 3 to 30, preferably from 8 to 15, and m is a high number of 100, but varies with the degree of dehydration, and the secondary layer consisting of a high polymeric binder, and the primary and secondary surface layers being bonded to one another by a hydrogen or ion bond. The high-polymer binder forming the secondary surface layer is characterised in that it consists of a binder, such as gelatin, urea formaldehyde resin, cation-active starch, oligomerous active silica, polyacrylate latex or cationic polyamides.

The process of producing the pigment according to the present invention is characterised in that a natural kaolin pigment is dispersed in an aqueous solution also containing water glass and an aluminium salt, preferably alum, so that $Al_2O_3$—$SiO_2$ hydrate gel is precipitated onto the kaolin surfaces at a pH between 1.5 and 5.0, preferably between 2.5 and 3.5, and that a polymeric binder capable of precipitating onto the said hydrate gel by hydrogen or ion bonding is simultaneously or subsequently added.

The pigment product is primarily intended as raw material for paper stock in the paper industry and as a paint pigment in the paint industry. The specific properties distinguishing it from the natural raw material and making it technically valuable in these industrial fields are as follows:

A. The pigment has a far better bonding capacity to itself and to cellulose fibers, and the strength properties of the paper in which it is included therefore are far better than those obtained when unmodified kaolin is used. The quantity of pigment in the paper can thus be increased considerably.

B. The opacity and whiteness of paper with modified kaolin are better than in paper containing ordinary kaolin of the same strength.

C. The printing properties are excellent and comparable with thinly-coated paper, which means a major saving of costs.

D. The modified kaolin, when used as a pigment in latex paint, gives a very high whiteness and very high hiding power in the dry state compared on a weight-for-weight basis, E. When used as a pigment in latex paint, the pigment bond will be better and the coat of paint will be less plastic and sensitive to temperature than with any other known pigment.

F. The coat of paint will have a lower density than with conventional pigments because the $Al_2O_3$—$SiO_2$ hydrate gel, on drying, will retain part of the large volume of the hydrated gel. The high bulk is also noticeable in paper.

EXAMPLE 1

This Example relates to paper containing kaolin with a primary layer of $Al_2O_3$—$SiO_2$ hydrate gel and a secondary layer formed of oligomerous silica.

Two 40% suspensions of 100 g of kaolin (English quality C) were prepared in water, one suspension containing 15 g and the other 30 g of water glass (25% $SiO_2$ and a ratio of 3.3). After the suspensions had been homogenised, 5 g and 10 g, respectively, of crystalline aluminium sulphate and 5 ml and 10 ml, respectively, of 5-normal sulphuric acid were added, all dissolved in 30 ml and 60 ml, respectively, of water. After homogenisation, the pH of the mixtures was 2.7, and a further 5 ml and 10 ml, respectively, of water glass diluted to 3 times the volume were added. After further dilution to a concentration corresponding to 33% of original kaolin in the suspension, the suspension had a pH of 3.2 at which the primary layer was allowed to form for 6 hours, whereupon a sample was taken for paper manufacture.

In this manner, a surface-modified kaolin with a primary layer containing 5% and 10%, respectively, of $SiO_2$, based on the kaolin, was obtained. The molar ratio $n = SiO_2:Al_2O_3$ should, theoretically, have been 11, but since a small quantity of Al ions remain in the solution at this pH, the actual molar ratio was $n = 10$.

Part of the suspension of kaolin with a primary layer containing 5% of $SiO_2$ was further modified by providing the kaolin with a secondary binder layer which was formed of oligomerous silica in the manner described below.

Laboratory sheets were produced from a fiber stock containing 80% well-refined thermomechanical pulp and 20% of bleached pine sulphate with a degree of refining of 24°SR (Schopper-Riegler). For all sheets (380 cm$^2$), 2 g of fiber mixture and 1.5 g of kaolin (unmodified) were taken. For the zero test (test C), 3 g of kaolin without modification were added. In test F, the surface-modified kaolin was mixed with 12% oligomerous silica into a quantity corresponding to 5% of kaolin 1 hour before mixing with the fiber stock. The pH of the stock was adjusted to 5 after the addition of a minor quantity of aluminium sulphate to achieve a "clear" water phase and optimum agglomeration. No retention agents were otherwise used.

|   | Kaolin added to 2 g of fiber | Al$_2$O$_3$—SiO$_2$ primary layer % SiO$_2$ | Secondary layer | Paper content of kaolin and mod. kaolin, respectively | Tensile index (Scan) Nm/g |
|---|---|---|---|---|---|
| A | 0 | 0 | — | — | 52 |
| B | 1.5 | 0 | — | 26% | 30 |
| C | 3.0 | 0 | — | 37% | 19 |
| D | 1.5 | 5% | — | 38% | 27 |
| E | 1.5 | 10% | — | 45% | 28 |
| F | 1.5 | 5% | 5% | 48% | 32 |

Approximately the same strength is thus achieved at 48% surface-modified kaolin as at 26% natural kaolin. The strength contribution can presumably be attributed to the secondary binder, in this case the oligomerous silica.

EXAMPLE 2

This Example relates to paper containing kaolin with a primary layer of Al$_2$O$_3$—SiO$_2$ hydrate gel and a secondary layer of urea formaldehyde resin.

100 g of kaolin (English quality C) were dispersed in 120 g of water and 30 g of water glass (25% SiO$_2$) to a 40% suspension. After homogenisation, 40 g of warm (45° C.) urea formaldehyde resin solution containing 63% dry solids and with a molar ratio of formaldehyde to urea of 1.45 was added. After further homogenisation, 50 ml or a solution of 10 g crystallised aluminium sulphate and 10 ml of 5-normal sulphuric acid were added. The pH of the mixture was 2.8, and the mixture was left for 1 hour for the urea resin to harden. The pH was then raised to 3.3 by a further addition of 10 g of water glass diluted to 30 ml. Precipitation and hardening were allowed to continue at this pH for 6 hours before the fiber stock was admixed and the pH was adjusted to 4.5. The molar ratio n=SiO$_2$:Al$_2$O$_3$ corresponded to 10-11.

A mixture of 60% of bleached birch sulphate and 40% of bleached pine sulphate refined to 30°SR was used as the fiber component. Laboratory sheets were produced from 2 g of fiber mixture and 2 g of kaolin material (including 20% urea resin, 8% (as dry) Al$_2$O$_3$—SiO$_2$ hydrate gel and 72% natural kaolin). The pH of the mixed stock was adjusted to 4.8 and some additional aluminium sulphate was added for maximum clarity of the water phase. Finally, a retention agent of polyacrylamide (PERCOL ®) was added in a proportion of 0.02% of the paper weight. In test E in the Table below, 1% of an ethyl acrylate acrylamide copolymer was also added to the surface-modified kaolin in a 10% suspension 10 minutes before this was mixed with the fiber stock. Tests A, B and C are "zero tests" to show the tensile index when the secondary layer of urea resin had not been applied.

|   | Kaolin material added | Content of kaolin and mod. kaolin, respectively, of the paper | Tensile index (Scan) Nm/g |
|---|---|---|---|
| A. | 0 | 0 | 60 |
| B. | 50% unmodified kaolin | 43% | 15 |
| C. | 50% with primary layer without resin | 48% | 24 |
| D. | 50% with primary layer and with resin | 49% | 35 |
| E. | 50% primary layer and with resin and with 1% acryl. pol. | 51% | 43 |

These tests illustrate that the urea resin as the secondary layer gives considerable contribution to strength, that is further increased by the addition of small quantities of polyacrylates.

EXAMPLE 3

This Example relates to paper containing kaolin with a primary layer of hydrate gel and a secondary layer of varying starch types and gelatin. Kaolin was dispersed and precipitated with a primary layer according to the same procedure as in Example 1. The content of SiO$_2$ in the primary layer was 6% of SiO$_2$, based on kaolin, and the molar ratio n=SiO$_2$:Al$_2$O$_3$ was 12. The sample for paper manufacture was taken after 12 hours of precipitation.

For coating with a secondary layer, the kaolin suspension was diluted to a content corresponding to 2 g of kaolin per 50-100 ml of water. Solutions of different starch qualities and gelatin were added to the diluted suspension as shown in the Table below. In some of the experiments, ethyl acrylate acrylamide copolymers were added to the modified kaolin before the starch and gelatin (1% and 0.5% polymer on the kaolin) as shown below.

In this Example, the fiber component consisted of a mixture of 60% bleached birch sulphate and 40% bleached pine sulphate at only 18°SR (Schopper-Riegler). The fiber component and the kaolin component were mixed so that every laboratory sheet would contain 2 g of fiber plus 2 g of kaolin plus its 2-layer modification. The pH of the stock was adjusted to 5 after the addition of aluminium sulphate for a clear water phase. A PERCOL ® retention agent corresponding to 0.02% of the paper weight was used. All percentages in the Table are based on the kaolin included (except for the content of kaolin material in the paper).

|   | Tert. layer content % | Sec. layer binder | Sec. layer content, % | Paper content of kaolin and mod. kaolin, respectively | Tensile index Nm/g | |
|---|---|---|---|---|---|---|
| A. | 0 | — | — | — | 40 | (cellulose comp. only) |
| B. | 0.5 | Gelatin | 7.5 | 53% | 33 | |
| C. | 1.0 | Starch, natural | 7.5 | 48% | 19 | |
| D. | 1.0 | Starch, oxidised | 7.5 | 41% | 9 | |
| E. | 0.0 | Starch, cationic | 6.0 | 51% | 22 | |
| F. | 1.0 | " | 6.0 | 54% | 26 | |
| G. | 1.0 | " | 7.5 | 55% | 30 | |
| H. | 0.5 | " | 7.5 | 53% | 29 | |
| I. | 0.5 | " | 15.0 | 51% | 22 | (excess of sec. layer) |

-continued

| Tert. layer content % | Sec. layer binder | Sec. layer content, % | Paper content of kaolin and mod. kaolin, respectively | Tensile index Nm/g | |
|---|---|---|---|---|---|
| J. 0.5 | " | 7.5 | 45% | 10 | (no prim. layer) |

As illustrated by these tests, cationic starch and gelatin contribute significantly to the strength as secondary layer, particularly together with acrylate polymer. However, without primary layer of $Al_2O_3$—$SiO_2$ hydrate gel, cationic starch gives no increase in strength, as is shown by test J. In test I, it seemed as if the large quantity of cationic starch caused a re-emulsification resulting in a lowering of the tensile index.

EXAMPLE 4

This Example relates to the technical production of paper containing kaolin with a primary layer of $Al_2O_3$—$SiO_2$ hydrate gel and with a secondary layer of urea formaldehyde resin. 100 kg of dry kaolin (English quality C) were dispersed in 100 l of water containing 30 kg of water glass (25% $SiO_2$ and a ratio of 3.4). After homogenisation, 45 kg of urea resin with a dry content of 67% and a molar ratio of formaldehyde to urea of 1.45 were added. After homogenisation and dilution with 25 l of water, the pulp was acidified by quickly stirring-in 10 liters of 5-normal sulphuric acid and 12.5 kg of crystallised aluminium sulphate dissolved in 40 l of water. After homogenisation, the pH was 3.1 and the pulp was allowed to precipitate and harden at this pH for 1 hour. A further 10 kg of water glass were then added, diluted with 2 parts of water. The pulp was then allowed to precipitate and harden at a pH of 3.3 for 6 hours, when it was transferred to a fiber stock and the pH was adjusted to 4.7. The composition of the finished kaolin suspension was 100 kg of kaolin, 10 kg of $SiO_2$, 1.8 kg of $Al_2O_3$ and 30 kg of urea formaldehyde resin. This corresponds to n=9-10.

A mixture of 60% bleached birch sulphate and 40% of bleached pine sulphate at 27°SR was used as the fiber component. In addition, 1% of rosin sizing (sulphate resin) was added to the fiber component. The fiber component and kaolin material were mixed in the proportions of 50/50. The stock was neutralised to a pH of 5 (without further addition of alum) and was left overnight for agglomeration. The pulp was then run on a small paper machine, with the addition of 0.015% PERCOL 292 ® as retention agent. No other acrylate polymer was added. The machine was supplied with diluted stock containing 0.55% dry solids (half of which was kaolin material). The white water had a dry solids content of only 0.025% and a kaolin content of 62%. This corresponds to a retention of no less than 90% of the kaolin material. Two paper thicknesses were produced, i.e. 80 g/m² and 50 g/m². The former contained 51% kaolin urea material and the latter contained 49%, i.e. very close to the stock composition in both cases. The paper was dried at a maximum roll temperature of 110° C. and was coated in the machine with 4% starch and calendered. The bulk before the calender was 1.70 cm³/g, and after the calender, from 1.30 cm³/g to 1.40 cm³/g.

Other characteristics of the paper were as follows:
Ash content: 35.0%
Kjeldahl-Nitrogen content: 3.7%
Opacity (Scan): 97%
Brightness (Scan): 87%
Bendtsen-Porosity: 1,000 ml/min
Bendtsen-Smoothness: 120/150 ml/min
Burst factor (Scan): 1.15 kg/cm³
Tensile index (Scan): 27 Nm/g
Dennissson WP: 11/9

I claim:

1. A surface-modified pigment of natural kaolin material intended for use as a pigment in paper and coats of paint, characterised in that it has on its pigment particles precipitated primary and secondary layers bonded to one another by hydrogen or ion bonding, the primary layer consisting of anionic $Al_2O_3$—$SiO_2$ hydrate gel having a molar ratio of $SiO_2$:$Al_2O_3$ of from 3 to 30, preferably from 8 to 15, and being present in an amount corresponding to from 2 to 15% by weight of $SiO_2$, based upon the original quantity of kaolin material, and the secondary layer consisting of a polymeric binder which is included in a quantity of at least 2% by weight, based upon the original quantity of kaolin material.

2. A pigment as claimed in claim 1, characterised in that the polymeric binder of the secondary layer consists of hydrogen-bonded gelatin, urea formaldehyde resin, polyacrylate or oligomerous silica.

3. A pigment as claimed in claim 1, characterised in that polyethoxy compounds in the form of non-ionic tensides or polyethylene glycols are included as cross-linking agents in the hydrogen bond.

4. A pigment as claimed in claim 1, characterised in that the polymeric binder of the secondary layer consists of ion-bonded cationic starch, cation-active polyamides or high-condensed cation-active urea resins.

5. A process of producing a surface-modified pigment as claimed in any one of claims 1-4, characterised in that pigment particles consisting of kaolin material are coated with a primary and a secondary layer under the action of hydrogen or ion bonding by dispersing the pigment particles in water and by admixing to the dispersion a water glass solution and a solution of aluminium salt and acid in order to precipitate at a pH of from 1.5 to 5.0, preferably from 2.5 to 3.5, a layer of anionic $Al_2O_3$—$SiO_2$ hydrate gel which serves as the primary layer and has a composition corresponding to a molar ratio of $SiO_2$:$Al_2O_3$ of 3-30, preferably from 8 to 15, and which gel is added in a quantity corresponding to from 2 to 15% by weight of $SiO_2$, based upon the original amount of kaolin material, and by further admixing a polymeric binder in an amount of at least 2% by weight, based upon the original amount of kaolin material, in order to form the secondary layer, and that the surface-modified pigment is dried and dehydrated only after application.

* * * * *